UNITED STATES PATENT OFFICE.

JOHANNES HÖLLDAMPF, OF CASSEL, GERMANY.

BEVERAGE.

1,027,336.   Specification of Letters Patent.   Patented May 21, 1912.

No Drawing.   Application filed April 9, 1910.   Serial No. 554,412.

*To all whom it may concern:*

Be it known that I, JOHANNES HÖLLDAMPF, a subject of the German Emperor, and residing at Cassel, Germany, have invented certain new and useful Improvements in Beverages, of which the following is a specification.

The present invention has reference to certain new and useful improvements in beverages and relates more specifically to beverages charged with a relatively large amount of carbonic acid, and it essentially consists in the process of mixing fermented cider with extract of hop without the least addition of malt.

The product has a strong, full taste, somewhat like beer, far superior to the flat, lemonade like taste of similar beverages.

In carrying out my new process, I first prepare cider by pressing out the juice of sour, but ripe apples and working it up in the well known manner. I then prepare an extract of hops, using about 4 pounds of hops to 100 liters of water. Sugar is also prepared in solution of 1 pound of sugar to 1 liter of water. For obtaining the desired dilution water is added, and finally, for obtaining a stiff, lasting froth, apple extract and carbonic acid are admixed. Of the concentrated apple essence whose composition is described in detail hereafter, I take about 2 pounds to make 8 liters of the extract. The process is carried out as follows: The hop extract is boiled, strained and pumped into a cooling-vat and thence through a cooling coil into a keg. 25 liters of this extract are then run into a mixing vat and mixed therein with 50 liters of matured cider, 12 liters of apple extract and 8 liters of sugar solution. The resulting mixture is then pressed by means of introduced carbonic acid through a filter into a mixing drum. 155 liters of water are then pumped into the latter and about 7 pounds of carbonic acid are added. The whole mass is agitated in any suitable manner, for instance by rotating blades, and intimately mixed thereby. The thus obtained beverage is then pressed into a keg or bottle-filling device by means of carbonic pressure.

According to the method described, 250 liters of beverage contain 25 liters of hop extract, 8.1 liters of sugar solution, 12.1 liters of apple extract, 50.1 liters of cider, 155.1 liters of water and 7 pounds of carbonic acid.

To enhance the keeping qualities of the beverage, it may be pasteurized. The liquid is of a light, golden color which in its appearance and capability to hold the froth cannot be distinguished from ordinary light lager-beer and on exposure to air soon turns stale, like beer. Turbidity can only be caused by yeast ferments in the cider.

The beverage is only alcohol-poor, but not alcohol-free, since already in the seasoned cider alcohol has been formed, and since also by the action of the malic acid on the sugar more alcohol is generated. However, the amounts of the various ingredients are so chosen that but a very low percentage of alcohol is produced.

In similar beverages hops have been added directly to the apple juice and the whole then caused to ferment, with the result that, as if hops were added directly to the matured cider, certain ingredients of the hops, as for instance hop resin, were dissolved by the generating or already present alcohol, imparting to the product a more or less disagreeable taste. This is entirely obviated by my process by first preparing a hop solution by boiling the hops with water, whereby all undesirable constituents are eliminated, partly remaining in the discarded hop leaves.

The beverage, by reason of the hops, distinctly differentiates from the ordinary lemonades and other so-called soft drinks. The percentage of alcohol varies between 0.6 to 1.5.

The apple essence above referred to, is made by expressing fresh apples (preferably rennets) concentrating the obtained must by evaporation and slightly coloring it with browning (burnt sugar) and finally adding a little tartaric acid for giving the solution a hearty taste. Since this essence, which I use in the form of a diluted extract, is also derived from apples, it does not in any way affect the characteristic properties of the beverage. This apple extract as such is not a froth former, but if used in conjunction with a hop extract, which latter is the real froth former, it serves to intensify and improve the froth. If in the manufacture of my new beverage the apple extract is left out, the froth is not nearly as copious and stiff, but is loose and quickly disappears. The sugar contained in the apple extract has something to do with this, but it is mainly due to the concentrated apple juices that such a stiff, lasting foam is generated, just like in ordinary beer the malt in connection with the hop causes that peculiar stiff and lasting, lathery froth which is the characteristic of a good beer.

What I claim and desire to secure by Letters Patent is:—

1. The process of making a carbonated beverage which comprises mixing together extract of hops, matured cider, apple extract and a sugar solution; filtering the resultant mixture, and mixing a carbonating agent with the filtered mixture.

2. The process of making a carbonated beverage which consists in preparing extract of hops, boiling and straining the extract; mixing the extract thus treated with matured cider, apple extract and a sugar solution; and mixing water and a carbonating agent with the resultant mixture.

3. A carbonated beverage composed of extract of hops mixed with matured cider, apple extract, a sugar solution, and a carbonating agent all in substantially the proportions specified.

In testimony whereof I affix my signature in presence of two witnesses.

JOHANNES HÖLLDAMPF.

Witnesses:
  JEAN OPPERMANN,
  FOSNYS EBEL.